M7843 OR X 7,958
[redacted]
Matthews & Kahles,
Rice & Clover Hulling Machine,
Patented Jan. 17, 1834.
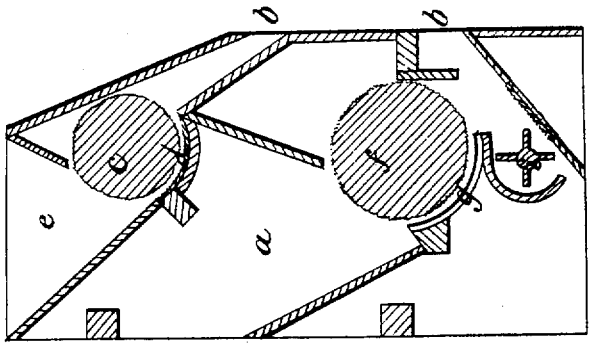
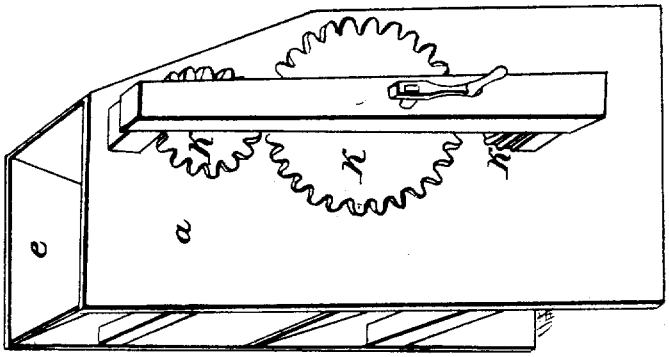
N. PETERS, PHOTO-LITHOGRAPHER, WASHINGTON, D. C.

The Schedule referred to in these Letters Patents and making part of the same containing a description in the words of the said James. H. Matthews & Mathew S. Kahle, themselves of their improvement being a Clover and Rice hulling Machine.

---

Be it known that we, James. H. Mathews and Mathew. S. Kahle of the Town of Lexington, County of Rockbridge, and State of Virginia, have made an improvement in the useful arts, being a machine for separating the seeds of Clover and Rice from their hulls, and cleaning the same by a revolving fan, entitled "Matthews and Kahle's Clover and Rice Hulling Machine" which is described as follows, reference being had to the annexed drawings.

This machine consists of the following principal parts.

A frame for containing and supporting the machinery;

A cylinder for breaking the heads of clover, and performing the rough part of the operation: another cylinder, placed below this, for more perfectly hulling or rubbing out the seed:

A revolving fan for cleaning; and the gearing by which the whole machinery is moved.

The Frame, a, is adapted, in size and strength to receive and sustain the machinery; it is made close at the two sides, with opening in the rear to admit the chaff or rubbish to escape, and for the workmen to attend to the operation of the cylinders in hulling the seed.

At the top of the machine is placed a cylinder. c. made of wood of any convenient diameter and length, covered with emery, coarse wire pins, or sheet iron punched in holes, having the projections facing outward; turning on gudgeons, supported on the frame, and revolving in a hollow segment bed, d, made of wire or punched sheet iron.

Over this cylinder the frame rises and forms a kind of hopper, e, into which the heads of clover and rice to be cleaned are first put.

This cylinder is for breaking the heads and separating the straw and chaff from the seeds. the seed falling through the concave sieve bed to the lower roller.

Below the first mentioned cylinder is placed another cylinder, f, of any convenient size, made also of wood, and covered with shark skin, sole leather, or any other suitable material, made waterproof of gum shellac, on which is laid or powdered, sand, emery, glass, or any other gritty substance.

This cylinder also turns upon gudgeons supported on the frame, and revolves in a concave bed, g, covered with shark skin leather or other suitable material; the seed descending upon a screen, h, placed below where it is cleaned.

The use of this second or fine cylinder is to hull the seed more perfectly than is done by the first or coarse cylinder: however, one cy=linder only, covered with a suitable material, may be made to answer the purpose of both; but two will in most cases be found preferable.

Below the finishing cylinder is placed a Revolving fan, i, for blowing off the chaff; it is made in the usual form, and turned by the main driving power.

The gearing by which the cylinder and winnowing or fanning ma-chine are driven, is placed outside of the casing of the frame, and may consist of cog wheels, k, or pulleys fixed on the axles of the cylinders, turned by a crank by manual power; or by straps and pulleys worked by horse or other power.

The fanning machine is turned by a strap passing over a pulley on the axle of the lower cylinder (when two are used) and a pulley on the axle of the revolving fan.

Operation. The clover heads or Rice, are put into the hopper on top, e, of the frame above the upper cylinder, and the machine being put in motion, carries the materials between the cylinders, and bed, d, where the straw and chaff are separated; the seed in falling thro' the concave sieve bed; and the chaff and straw passing off thro' an opening, m, made in the casing for that purpose leaving the seed, partly cleaned, now descends to the second or lower cylind. f, and bed, g, covered with leather (x x x x x x x x x x x x x x x x x x x
x x x x x x x x x x x x x x x x x x x x x x x x x x x x x x x x x x This line illegible in original upon a screen, h, where in descending the chaff is blown off by the fan, i, and then the seed falling upon the screen below passes thro' it to the floor or into a vessel placed below to receive it, where one cylinder only is used then the seed passes immediately from it to the winnowing machine.

The invention here claimed consists in the peculiar construction of the machine for hulling clover seed and rice with the combination and arrangement of its several parts as above described.

Witnesses.
D. E. Moore.
J. Jordan.

James. Wm Mathews
Mathew. S. Kahle

I assign all my right, title, and interest in the above Patent to Matthew. S. Kahle for Value Rec'd this the 4th day of March in the year of our Lord 1834.

James. Wm Mathews.

Received & Recorded anew
October 21st 1865.

Patented January 17th 1834

1000 words